Willard H. Leavens
Albert C. Poujol
INVENTORS

BY Carl B. Fox, Jr.
ATTORNEY

United States Patent Office 3,543,371
Patented Dec. 1, 1970

3,543,371
METHOD OF MANUFACTURING SCREENS
Willard H. Leavens and Albert C. Poujol, both of 3007
Honeydew, P.O. Box 36512, Houston, Tex. 77036
Filed Jan. 16, 1968, Ser. No. 698,192
Int. Cl. B23p 15/12
U.S. Cl. 29—160                                4 Claims

ABSTRACT OF THE DISCLOSURE

The disclosure is of filter or screen apparatus wherein single or multiple superimposed screen webs are provided, the screen edge being bound together by a unitary U-shaped edge binding, and to improved methods of manufacturing such screen or filter apparatus. The methods include the use of stamping operations, including both cutting and forming operations.

BACKGROUND OF THE INVENTION

Field of the invention

The field of the invention is the field relating to screen and filter apparatus, and methods of manufacturing such apparatus. The screens or filters are of the bound type, wherein there is provided a one-piece integral edge binding, usually of metal, having a U-shaped cross section, which not only protects the screen or filter edges but provides for holding the screen or filters in assembled condition. As to manufacture of the apparatus, the methods include stamping processes with use of dies, both cutting and forming steps being included. In addition, a closing, or assembling, step is employed.

Description of the prior art

The prior art apparatus of the type herein contemplated have been made by what might be termed "handmade" methods, each step of manufacture being a separate, non-integrated, operation, each such operation requiring a separate work station and tool. The stock was first cut to circular outline, then the edge bent, then the center opening cut out, and then the resulting binding piece being assembled with the screen elements by inward crimping around its periphery. At each stage, centering was required, this being accomplished by sight and/or feel without guides to accomplish accurate centering. Therefore, screens provided according to these methods have been less than perfect in appearance and utility.

SUMMARY OF THE INVENTION

In summary, the invention affords screen or filter apparatus of improved characteristics, and improved methods for their manufatcure. The screens provided according to this invention are improved in that they are more rigid, secure, more dependable, and less subject to damage and deterioration than screens heretofore provided. The methods are adaptable to screens or filters having a single screening or filter element, and also to screens or filters having plural such elments. According to the invention, the previous separate manufacturing steps have been eliminated, and combination manufacturing techniques have been applied whereby the time and handling difficulties during manufacture have been improved.

A principal object of the invention is to provide improved screening and filteration apparatus, and to provide simplified yet more reliable methods of manufacturing such apparatus, and at lower cost.

Other objects and advantages of the invention will appear from the detailed descriptions of preferred embodiments of the apparatus and methods.

DESCRIPTION OF THE PREFERRED EMBODIMENTS

In the manufatcure of screening and filtration equipment of the type contemplated by this invention, it has heretofore been the practice, as briefly stated hereinabove, to separaely perform the several successive steps of manufacture. First, a binding element for each screen or filter must be provided, and it has been the practice to comemnce by formation of circular discs or plates of suitable metal, these being successively placed and centered between interacting dies, and the first forming step being the step of bending or forming the edge of the circular disc into an L-shaped cross section, and then as a separate step cutting or punching a smaller circular disc concentrically therefrom to provide an opening through the binding. After these four steps have been completed, it has been the practice to manually position the layer or layers of filtering or screening manual and then to close the screens by a forming operation.

According to this invention, two of the above procedural steps have been eliminated. According to the invention, it is not necessary to supply a pre-cut circular disc for placement between the initial set of dies. A plate of any size and shape is placed between the dies, and the dies in one sequential combination operation initially cut the outer edge of the disc, then form the L-shaped cross section of the binding, and then as the final sequential step cut from the center of the binding blank the central opening through which filtration is accomplished. All of these steps are completed in one combination operation, without necessity of alignment or centering and without necessity for movement of the binding blank from one machine to another and centering it for the next step.

After the binding is completed, it is moved to a second set of dies where one or more filter or screen webs are disposed therein, and the manufacture completed by a forming operation whereby the L-shaped cross section of the binding is altered to a flattened U-shape wherein the binding emcompasses the edges of the filters or screens and securely holds them in assembled condition. Instead of being processed by four successive machines, or stages, only two successive machines are employed according to the above procedure.

Figure 1:
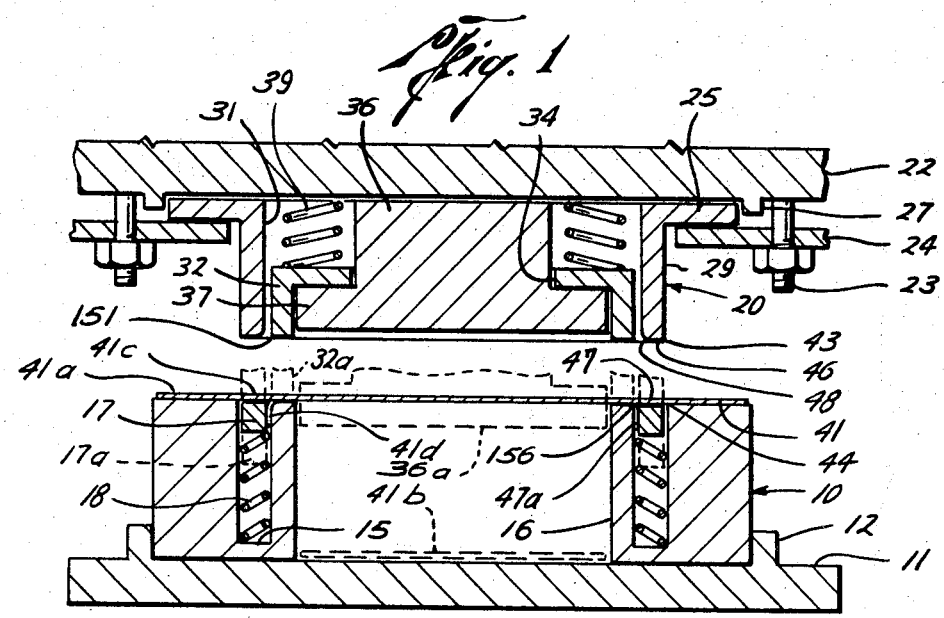
FIG. 1 is a vertical cross-sectional view of a preferred form of apparatus illustrating performance of the preferred methods herein described, for manufacture of the improved apparatus contemplated according to this invention.

Referring now to FIG. 1 of the drawings, there is shown a combination die assembly, there being a lower die 10 supported upon bench or other support 11, the latter being provided with an upstanding circular flange or ridge 12 the inner surface of which is adapted to encompass the lower side of the die.

A circular slot 15 is concentrically formed from the upper surface of the die, this slot or recess extending to a considerable depth into the die as shown. The die has a central opening 16. Within slot 15 there is disposed a ring 17 which is biased to an upwardly disposed position wherein its upper surface is substantially flush with the upper surface of the die body, plural compression springs 18 beneath ring 17 in the slot 15 providing the upward biasing of the ring. Ring 17 may be depressed down into slot 15 by compression of springs 18.

An upper die assembly 20 is disposed beneath the upper head or ram of the stamping press, or like equipment, the ram being indicated by reference numeral 22. Die assembly 20 is held in place by a plurality of circularly spaced bolts or studs 23, only two being shown, and bosses 24 through perforations of which the bolts or studs pass, the opposite end of the bosses 24 being disposed against the flange 25 of the die asembly. A ring-shaped flange 27 may be provided for accurate positioning of the die assembly, the inner surface of same closely fitting the outer periphery of flange 25.

The die body 29 has concentric circular opening 31 within which is disposed a movable die 32 having an L-shaped configuration, this having a concentric circular opening 34 therethrough through which is disposed a cylindrical die 36 having a surrounding flange formation 37. Die 32, and die 36 through flange 37, is biased downwardly by compression springs 39.

The die assembly of FIG. 1 is operated to form a binding of L-shaped cross section, in one step, in the following manner: A sheet or blank 41, of indefinite size and shape, is placed between the dies, and upon downward motion of the ram 22 the cutting edge 43 at the outer periphery of die body 29 cuts the outer circle or periphery 44 from the sheet 41 of metal material. As the lower end 46 of die 29 continues downwardly to enter slot 15, thereby depressing ring 17 against springs 18, the outer edge portion 47 of sheet 41 is bent downwardly against curved edge 48 to lie in position 47a as shown in FIG. 1. As the upper die assembly continues downwardly, the dies 29 and 36 continue their downward travel while the lower end of die 32 against the upper metal sheet surface is restrained against further downward movement and is retained in a relatively upward position 32a. As die 36 moves toward its lower position 36a its peripheral lower cutting edge 151 cuts out a circle of metal to form the central opening of the binding. The cut-out circle of metal may then fall to the position 41b. As will be understood several circles 41b may accumulate in the space within opening 16 before their removal is necessary, or an opening through bench 11 may be provided for their removal. A curved edge 156 is provided so that the downwardly bent edge portion 47a of the binding ring, is smoothly bent. Upon raising of ram 22, the upper die is removed from its inserted condition within the lower die and resumes its previous raised position. Ring 17, compelled by springs 18, rises against the binding ring to release it from the lower die. Upon removal of the part 41a, outside of the lower die, the dies are in condition for insertion of a succeeding metal sheet and repetition of the operation.

Figure 2:
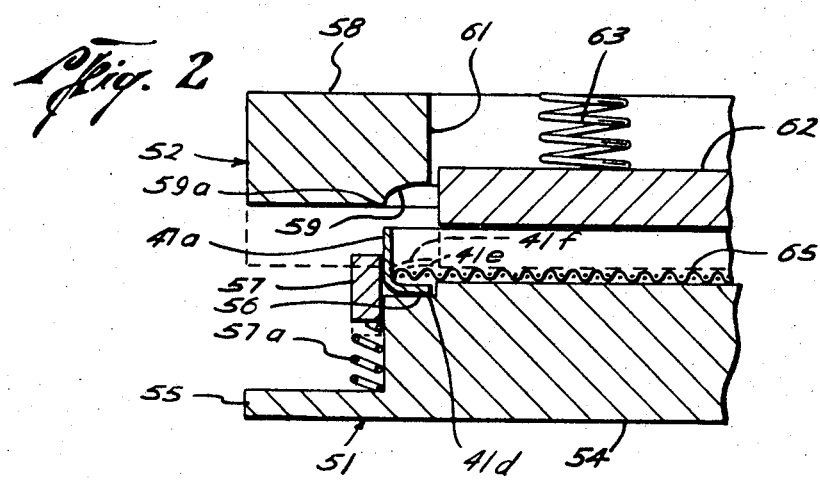
FIG. 2 is a partial vertical cross-sectional view showing an additional set of dies or stamping equipment utilized in completion of the manufacturing process herein described and claimed.

Referring now to FIG. 2 of the drawings, the lower die assembly 51 and the upper die assembly 52 are held between a lower bench or table surface, not shown, and the upper movable part or ram, not shown, of a press. The lower die assembly 51 includes a circular disc-shaped die body 54 having therearound an integral flange 55 at its lower side. The die body has around its upper end a relief 56. The upper die assembly 52 includes a ring-shaped die body 58 having a curved relief or recess 59 around its lower interior. Die body 58 is of ring-shaped circular form and has therethrough a circular passage 61. Within passage 61 there is disposed a die 62 in the shape of a circular disc, this die part being biased against upward movement by helical compression springs 63, only one being shown. Die part 62 is normally in the solid line position shown in FIG. 2 with respect to the solid line position of die body 58.

A ring-shaped die part 57 surrounds the upper part of die body 54, and is biased upwardly by helical compression springs 57a.

Passage 61 is of a diameter greater than the diameter of the portion of die body 54 above recess 56. The edge 59a of relief 59 is of the same diameter as the central portion of die body 54, above flange 55 and beneath relief 56. Ring-shaped die part 57 fits relatively closely around die body 54.

The circular strip 41c, bent in the operations described with reference to FIG. 1 into the form 41d, of L-shaped cross section, is placed, with the downturned flange portion extending upwardly, in other words, the circular strip is inverted from its FIG. 1 position and placed within recess or relief 56 shown in FIG. 2, the internal dimension of this recess being such to permit reception of the binding 41d thereinto. The outer periphery of the binding strip is against or closely adjacent to the inner surface of die part 57, which assists in the holding of the binding ring centralized. Upon lowering of the ram holding die assembly 52, the upper end of binding 41d is received around the outer part of relief 59, while die part 62 engages against the upper surface of the screen or filter layer or layers 65. As die assembly 52 is moved farther downward, spring 63 begins to compress. At the same time die body 58 engages the upper surface of ring-shaped die 57 and compression of springs 57a commences. As die assembly 52 continues to move downwardly, the upper end of binding ring 47a is compelled to slide upwardly and inwardly against the interior surface of relief 59 until it is moved or compressed to the position 41e of FIG. 2. As will be understood, the binding strip in condition 41e overlies both sides of the screen or filter elements 65 and binds and protects them permanently.

Figure 3:
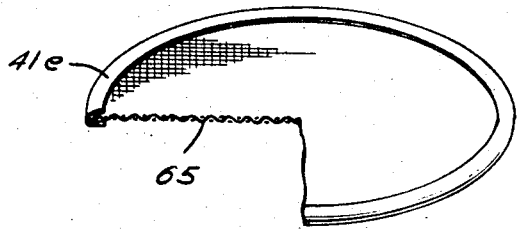
FIG. 3 is a perspective view, showing a preferred embodiment of screen apparatus according to the invention, the view showing one-fourth of the screen cut away and thereby showing the apparatus partially in cross section.

The completed strainer or filter is in the form shown in FIG. 3 of the drawings. The screen layer 65 is disposed flatly, and flushly, if plural in number, and the binding element 41e is imposed against the screen elements at each side thereof around their edges. The binding 41e is integral and has no breaks or irregularities over its length.

As shown in both FIGS. 2 and 3, the upper side 41f of the binding ring, when bent to the form 41e, is curved in conformity with the curve of the upper left side of recess 59, while the lower side 41d of the binding ring is flat in conformity to the shape imposed thereto between rings 32 and 10. These shapes of the sides of the binding provide several advantages. The flat side is adapted for flush fit against surfaces surrounding the location of use of the screen. The screen webs 65 are held firmly at their extreme outer edges along a circular line where the binding sides are closer together at the outer edges of webs 65 and where the binding material has less flexibility since it is closer to the U-bottom and is less subject to opening leverage or outward bending than are more central portions toward the inner edge of the binding. The curve at the upper side of the binding provides for compression fit of the bindings to prevent gas or liquid seepage therepast in use. Therefore, the screens are of more durable and fault-free construction, and are more reliable and efficient in use than previously known screens of similar nature.

To further clarify the structure and importance of the shape of the binding ring, the web or webs 65 are placed in the incomplete binding ring with binding ring web flat against the lower side of recess 56, web or webs 65 being centered. When die assembly 52 moves down, the shallower, downwardly curved outer curved part of recess 59 strikes the binding ring with greater compressive force so that the web or webs 65 are bound tighter between the opposite sides of the binding ring at the edges of the web or webs than inwardly thereof. Since the binding force is greatest along this circular line, the web or webs are very firmly held, more firmly than if the webs were gripped over the entire areas of the binding ring sides. This results in flexibility in the binding ring side 41f inwardly of the circle where the forceful edge holding of web or webs 65 occurs. This structure of concentrated holding force on the web edges is achieved without necessity of upsetting or ridging the inner face of the upper side of the binding ring. The pressure of the binding ring on the opposite sides of the web edges is continuous around the webs, since the webs have inherent flexibility, and the pressure is concentrated at the web edges where the die spacing is least.

The dies as shown in the drawings are in part schematic, in that means for movably interlocking the die parts of each die assembly are not shown. Means of various forms for this purpose are known in the prior art, and are obvious, and any suitable such means may be employed in connection with the invention.

The press equipment may be of any suitable type, and may be of the mechanical or hydraulic type. The stamping, cutting or forming, is done at high speed, and with heavy impact, and production of the screens according to the invention may proceed at a rapid rate.

The material employed for the bindings may be any suitable metal or any other material suitable to the cutting and forming operations and which will perform as required in the finished screens.

While preferred embodiments of the apparatus and methods have been shown and described, many modifications thereof may be made by a person skilled in the art without departing from the spirit of the invention, and it is intended to protect by Letters Patent all forms of the invention falling within the scope of the following claims:

We claim:

1. Method for manufacturing edge bound screens and filters of the type wherein at least one web of discontinuous material is bound around its edges between the opposite sides of a binding ring of substantially U-shaped cross section, comprising placing a sheet of material of which the binding ring is to be formed between a first set of dies adapted to cut the inner and outer sides of a flat ring adapted to be formed into the binding ring and to downturn an outer portion of the flat ring in a substantially simultaneous combination stamping operation, actuating the dies to perform said stamping operation, removing the cut and partially formed binding ring from between said first set of dies, placing said cut and partially formed binding ring, together with at least one web of discontinuous material disposed to overlie at one of its sides the inner portion of the cut and partially formed binding ring and disposed with its outer edges adjacent the inner side of the downturned outer portion of the binding ring, between a second set of dies adapted to inturn said downturned outer portion of the binding ring toward the other side of the web of discontinuous material in a stamping operation, and actuating the second set of dies to perform said stamping operation.

2. The method set forth in claim 1, wherein the dies of said second set of dies have a minimum stamping clearance along a line laterally offset from the edges of the web of discontinuous material.

3. The method set forth in claim 2, wherein said inner portion of the binding ring is not deformed and wherein the downturned and inturned outer portion of the binding ring is convexly curved over the edges of said webs.

4. The combination of claim 3, wherein said webs are most firmly pressed between said inner and outer portions of the binding ring along said line laterally offset from the web edges and spaced from the edges of the binding ring.

References Cited

UNITED STATES PATENTS

| 1,597,889 | 8/1926 | Hulbert. | |
|---|---|---|---|
| 1,629,504 | 5/1927 | Iversen. | |
| 1,741,118 | 12/1929 | Rosenfeld et al. | 29—511 |
| 2,038,306 | 4/1936 | Miller | 29—160 X |
| 2,325,929 | 8/1943 | Amesbury et al. | 29—509 |
| 3,268,984 | 8/1966 | Kupchick. | |

FOREIGN PATENTS 122,867  11/1946  Australia.

JOHN F. CAMPBELL, Primary Examiner

V. A. DiPALMA, Assistant Examiner

U.S. Cl. X.R.

29—243.52, 509, 520